(12) United States Patent
Sanders et al.

(10) Patent No.: US 7,483,143 B2
(45) Date of Patent: Jan. 27, 2009

(54) METHOD AND APPARATUS FOR CONDUCTING HETERODYNE FREQUENCY-COMB SPECTROSCOPY

(75) Inventors: Scott T. Sanders, Madison, WI (US); Joachim W. Walewski, Unterhaching (DE)

(73) Assignee: Wisconsin Alumni Research Foundation, Madison, WI (US)

( * ) Notice: Subject to any disclaimer, the term of this patent is extended or adjusted under 35 U.S.C. 154(b) by 153 days.

(21) Appl. No.: 11/447,631

(22) Filed: Jun. 6, 2006

(65) Prior Publication Data

US 2007/0182966 A1 Aug. 9, 2007

Related U.S. Application Data

(60) Provisional application No. 60/765,963, filed on Feb. 7, 2006.

(51) Int. Cl.
*G01B 9/02* (2006.01)
(52) U.S. Cl. ........................................ 356/454; 356/484
(58) Field of Classification Search ................. 356/451, 356/453, 454, 484, 491
See application file for complete search history.

(56) References Cited

U.S. PATENT DOCUMENTS

| | | | |
|---|---|---|---|
| 5,663,822 A * | 9/1997 | Fee ............................... | 398/95 |
| 5,748,309 A | 5/1998 | Van der Weide et al. | |
| 6,493,091 B2 * | 12/2002 | Kourogi et al. ............. | 356/489 |
| 6,591,026 B2 * | 7/2003 | Endo et al. ................... | 385/15 |

OTHER PUBLICATIONS

"Time-Domain Mid-Infrared Frequency-Comb Spectrometer," Optics Letters, vol. 29, No. 13, Jul. 2004 by Fritz Keilmann.
"Frequency-Comb Infrared Spectrometer For Rapid, Remote Chemical Sensing;" Optical Society of America, 2005, by Schliesser et al.
"Picosecond Dual-Source Interferometer Extending Fourier-Transform Spectrometer To Microwave Regime;" 1996 IEEE MTT-s Digest, pp. 1731-1734 by D. W. van der Weide et al.
"Terahertz Spectroscopy and Applications II;" Proceedings European Optical Society, vol. 3828, pp. 276-284, Jun. 1999.

* cited by examiner

*Primary Examiner*—Hwa (Andrew) S Lee
(74) *Attorney, Agent, or Firm*—Boyle Fredrickson, S.C.

(57) ABSTRACT

An apparatus and method are provided for conducting heterodyne frequency-comb spectroscopy. The apparatus includes a first and second frequency-comb generators for generating corresponding first and second continuous wave laser beams, respectively. The first beam defines a spectrum of light having a plurality of modes spaced by a first frequency. The second beam defines a spectrum of light having a plurality of modes spaced by a second frequency that is greater than the first frequency. The first and second beams are combined and the optical power of the combined beam is monitored with a data acquisition system to record a time trace. The recorded time trace is Fourier transformed such that each of spectrums of the first and second beams will exhibit a low-frequency comb. By superimposing the two combs, a beat frequency in a low-frequency region is assigned to an optical frequency.

25 Claims, 6 Drawing Sheets

METHOD AND APPARATUS FOR CONDUCTING HETERODYNE FREQUENCY-COMB SPECTROSCOPY

CROSS-REFERENCE TO RELATED APPLICATIONS

This application claims the benefit of U.S. Provisional Application Ser. No. 60/765,963, filed Feb. 7, 2006.

REFERENCE TO GOVERNMENT GRANT

This invention was made with United States government support awarded by the following agencies: DOE DE-FC26-02NT41431. The United States has certain rights in this invention.

FIELD OF THE INVENTION

This invention relates generally to Fourier-transform spectroscopy, and in particular, to method and apparatus for conducting heterodyne frequency-comb spectroscopy utilizing a pair of continuous-wave, frequency-comb generators.

BACKGROUND AND SUMMARY OF THE INVENTION

Fourier-transform infrared spectrometry is an established and very powerful tool for the spectral analysis of light emitted and transmitted by gases, liquids and solids. In its most common form, a Fourier transform spectrometer includes two mirrors located at a right angle to each other and oriented perpendicularly. A beamsplitter is positioned at the intersection of the reflection of the mirrors and oriented at a 45° angle relative to the mirrors. Radiation, such as light, is directed at the beamsplitter such that the beamsplitter divides the beam into two parts. The parts of the beams are reflected off corresponding mirrors and recombined. The recombined parts of the beam are sensed by a detector at the output of the spectrometer. It can be appreciated that the signal recorded at the output is dependent upon the wavelength of the light and the optical path difference between the beamsplitter and each of the two mirrors. By varying the position of one of the mirrors along a predetermined axis, an interference pattern is generated.

In heterodyne spectroscopy, the different colors of light that are naturally encoded by their unique wave frequencies are exploited. These frequencies are generally too high to be detected directly. As such, frequency down-conversion can be achieved by mixing a light wave with narrow-bandwidth light of a known, but slightly different frequency. Consequently, the envelope of light will oscillate at a beat frequency, i.e., the difference between the frequencies of the two light waves. The beat frequency can be tailored to reside in the radio frequency and lower frequency bands. It becomes a simple task to measure the amplitude of the beat frequency using standard detectors and standard data acquisition devices like oscilloscopes. However, it can be appreciated that researchers often need to measure more complicated spectra, encompassing thousands of data points, rather than just two. Consequently, in order to expand the basic heterodyne spectroscopy approach to full spectral measurements, one would need a large number of lasers with known frequencies. Hence, this approach can be unduly burdensome.

In order to overcome the limitations of the basic heterodyne spectroscopy approach, mode-locked femtosecond lasers have been used. As is known, the spectrum of a mode-locked femtosecond laser is defined by a comb of equidistant frequencies called modes. By overlapping the output of two lasers that generate slightly different combs, one can generate a multiplicity of down-converted frequency pairs. More specifically, the difference in the spacings between the combs is kept so small that the beat frequency of the two modes is significantly smaller than the mode spacing of a single comb. The combined beams from the two lasers will exhibit beats at multiples of the difference in the spacings between the combs. If the spectrum of the light is inferred from the Fourier transform of the signal's time trace, the spectrum will exhibit a low-frequency comb with the above-described spacing due to the optical beating. As a result, any frequency pairs would be attenuated and show up in the beat spectrum. By superimposing the two combs, a beat frequency in a low-frequency region is assigned to an optical frequency.

While functional for its intended purpose, it can be appreciated that the use of mode-locked femtosecond lasers is cost prohibitive for most applications. Individual femtosecond lasers can cost several hundred thousands of dollars. As a result, it is highly desirable to provide a simple and inexpensive heterodyne frequency-comb spectroscopy system that allows for full spectral measurements. In addition, the use of mode-locked femtosecond lasers generally requires the use of moving parts, which adds to the cost and complexity of this approach.

Therefore, it is a primary object and feature of the present invention to provide a heterodyne spectroscopy system that allows for full spectral measurements.

It is a further object and feature of the present invention to provide a heterodyne frequency-comb spectroscopy system that is inexpensive and technically simple.

It is a still further and object of the present invention to provide heterodyne frequency-comb spectroscopy system that utilizes continuous-wave, frequency-comb generators and is free of moving parts.

In accordance with the present invention, an apparatus is provided for conducting heterodyne frequency-comb spectroscopy. The apparatus includes a first frequency-comb generator for generating a first continuous wave laser beam. The first beam defines a spectrum of light that includes a plurality of optical frequencies spaced by a first frequency. A second frequency-comb generator generates a second continuous wave laser beam. The second beam defines a spectrum of light that includes a plurality of optical frequencies spaced by a second frequency. A beam combiner is operatively connected to the first and second frequency-comb generator. The beam combiner combines the first and second beams and provides the same as a combined beam. The combined beam has a plurality of beat frequencies dependent upon the optical frequencies of the spectrums of light defined by the first and second beams.

The first frequency-comb generator includes a filter having an input and an output. The filter controls the spacing of the plurality of optical frequencies of the first beam. The filter includes an etalon and the first frequency-comb generator includes a controller operatively connected to the filter. The controller controls the temperature of the etalon. The spacing of the plurality of optical frequencies of the first beam is dependent on the temperature of the etalon.

The first frequency-comb generator includes an optical amplifier for generating an initial laser beam having predetermined optical power and an output coupler. The output coupler generates the first beam from a first output portion of the optical power and directs a feedback portion of the optical power to the input of the filter. The first output portion of the optical power is generally equal to 2 percent of the optical power.

The first frequency-comb generator may also include an isolator operatively connected to the linear optical amplifier and to the optical coupler. The isolator insures the optical power propagates in a first direction. An optical attenuator has an input operatively connected to the output of the filter and an output. A polarization cavity has an input operatively connected to the output of the optical attenuator and an output operatively connected to the input of the optical actuator. The optical attenuator controls the optical power of the initial laser beam. The polarization cavity maintains the linear polarization of the feedback portion of the optical power.

A spectrum analyzer may be operatively connected to the beam combiner. The spectrum analyzer records the combined beam. An enclosure is provided for receiving the first and second frequency-comb generators therein.

In accordance with a further aspect of the present invention, an apparatus is provided for conducting heterodyne frequency-comb spectroscopy. The apparatus includes first and second frequency-comb generators. Each frequency-comb generator includes a laser cavity and an output coupler. The laser cavity propagates optical power traveling thereon. The output coupler optically communicates with the laser cavity for receiving the optical power. The output coupler generates a continuous wave laser beam from a first output portion of the optical power. The continuous waver laser beam defines a spectrum of light that includes a plurality of optical frequencies spaced by a frequency. A beam combiner is operatively connected to the first and second frequency-comb generators. The beam combiner combines the first and second continuous wave laser beams generated by the first and second frequency-comb generators and provides the same as a combined beam. The combined beam has a plurality of beat frequencies dependent upon the optical frequencies of the spectrums of light defined by the first and second continuous wave laser beams.

Each frequency-comb generator includes a filter optically communicating with the laser cavity. The filter includes an etalon and each frequency-comb generator includes a controller operatively connected to the filter. The controller controls the temperature of the etalon. The spacing of the plurality of optical frequencies of the spectrum of light is dependent on the temperature of the etalon. The first output portion of the optical power is generally equal to 2 percent of the optical power. A spectrum analyzer may be operatively connected to the beam combiner. The spectrum analyzer records the combined beam.

In accordance with a still further aspect of the present invention, a method is provided for conducting heterodyne frequency-comb spectroscopy. The method comprises the steps of generating at least one continuous wave comb defined by a plurality of optical frequencies. The optical frequencies of the at least one continuous wave comb are down-converted and an optical spectrum for the at least one continuous wave comb is determined from the down-converted optical frequencies.

The step of generating the at least one continuous wave comb includes the steps of generating a first continuous wave laser beam having a plurality of optical frequencies spaced by a first frequency that define a first continuous wave comb and generating a second continuous wave laser beam having a plurality of optical frequencies spaced by a second frequency that define a second continuous wave comb. The step of down-converting the optical frequencies includes the step of superimposing the first and second continuous wave combs to determine a beat spectrum. The step of generating the first continuous wave laser beam includes the step of generating optical power having a spectrum. At least a portion of the optical power is filtered so that the spectrum has the plurality of optical frequencies spaced by the first frequency. The first continuous wave laser beam is generated in response to the spectrum. The step of filtering at least a portion of the optical power includes the additional step of passing the portion of the optical power through an etalon.

In accordance with a still further aspect of the present invention, a method is provided for conducting heterodyne frequency-comb spectroscopy. The method includes the step of generating at least one continuous wave comb defined by a plurality of optical frequencies. The plurality of optical frequencies is designated to generate modulations at lower beating frequencies and the lower beating frequencies are designated to observe an optical spectrum.

The method may include the additional step of exposing the at least one continuous wave comb to a predetermined stimulus. The exposing step may include the step of passing the at least one continuous wave comb through a sample. The at least one continuous wave comb may be generated by generating a first continuous wave laser beam having a plurality of optical frequencies spaced by a first frequency that define a first continuous wave comb and generating a second continuous wave laser beam having a plurality of optical frequencies spaced by a second frequency that define a second continuous wave comb. In addition, the step of designating the plurality of optical frequencies may include the step of superimposing the first and second continuous wave combs to generate the lower beating frequencies.

BRIEF DESCRIPTION OF THE DRAWINGS

The drawings furnished herewith illustrate a preferred methodology of the present invention in which the above advantages and features are clearly disclosed as well as others which will be readily understood from the following description of the illustrated embodiment.

In the drawings:

FIG. 8b is a graphical representation of the power versus the frequency of the frequency-combs generated by the apparatus of FIG. 8a;

FIG. 9b is a graphical representation of the spectral power versus the optical frequency of the absorption spectrum generated by the apparatus of FIG. 9a; and FIG. 8c is a graphical representation of the down-converted signal depicted in FIG. 9b showing the spectral power versus the beat frequency in the radio frequency range.

DETAILED DESCRIPTION OF THE DRAWINGS

Figure 1:
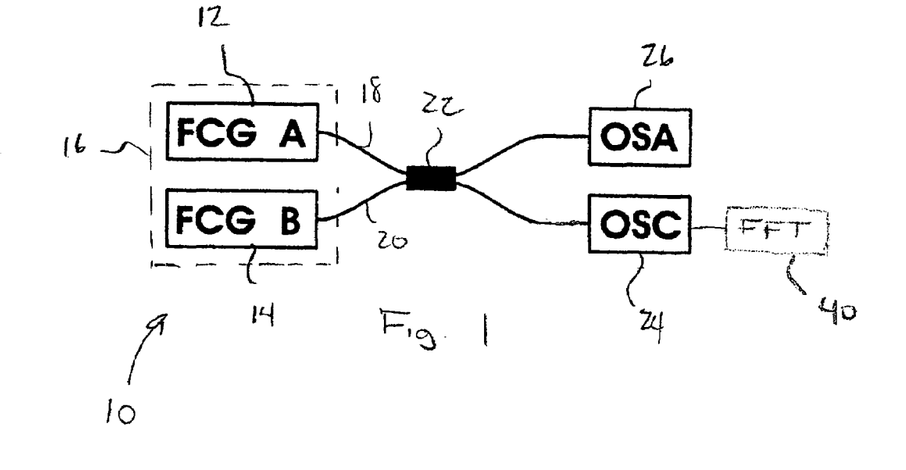
FIG. 1 is a schematic view of an apparatus for conducting heterodyne frequency-comb spectroscopy in accordance with the present invention.

Referring to FIG. 1, the frequency-comb spectroscopy system of the present invention is generally designated by the reference numeral 10. Frequency-comb spectroscopy system 10 includes first and second frequency-comb generators 12 and 14, respectively, housed within a single cavity such as environmentally sealed box 16. As hereinafter described, the outputs 18 and 20 of first and second frequency-comb generators 12 and 14, respectively, are combined at node 22 and provided to oscilloscope 24 and optical spectrum analyzer 26. It is noted that first and second frequency-comb generators 12 and 14, respectively, are identical in structure. As such, the description hereinafter of first frequency-comb generator 12 is understood to describe the structure of second frequency-comb generator 14 as if fully provided herein.

Figure 2:
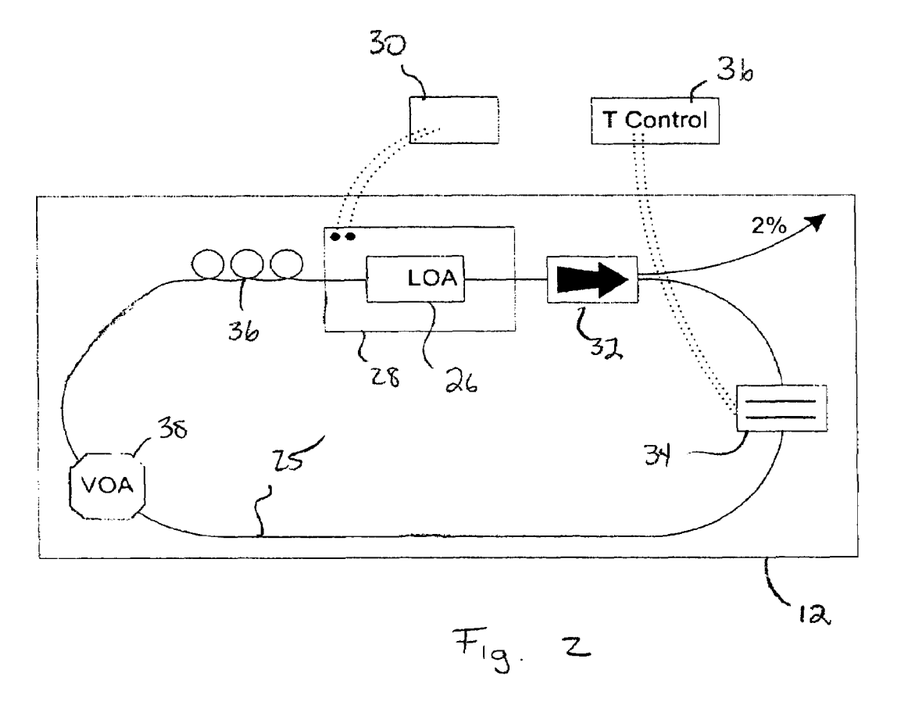
FIG. 2 is a schematic view of a frequency-comb generator for the apparatus of the present invention.

Referring to FIG. 2, first frequency-comb generator 12 includes a fiber cavity such as fiber ring 25 for propagating optical energy between the various components of first frequency-comb generator 12 hereinafter described. It is noted that the following description of the location of the various components on fiber ring 25 is merely exemplary and that the various component may be rearranged on fiber ring 25 without deviating from the scope of the present invention. Fiber ring 25 may take the form of a polarization-maintaining, dual-clad fiber. By way of example, the material from which fiber ring 25 is fabricated may doped with laser-active atoms or molecules and the core of fiber ring 25 may be embedded in a transparent second cladding in order to propagate the optical energy along the resonator core.

First frequency-comb generator 12 further includes an optical amplifier such as linear optical amplifier 26 mounted on base plate 28 and electrically coupled to power source 30. Linear optical amplifier 26 is a semiconductor optical amplifier designed such that its output power is highly linear with respect to input power. It is similar to a conventional semiconductor optical amplifier, except that a vertical-cavity surface-emitting laser operates simultaneously in the same gain medium as the amplifier. However, it can be appreciated that a conventional optical amplifier may be used without deviating from the scope of the present invention. The laser or optical energy generated by linear optical amplifier 26 is continuous and has a spectrum defined by a frequency-comb that is generated by the resonator core of fiber ring 25 in which the lasing material is embedded, since only integer multiples of the laser wavelength fit into the resonator core.

The optical energy outputted of linear optical amplifier 26 is provided to optical isolator 32. As is conventional, isolator 32 eliminates the effects of optical feedback of the optical energy generated by linear optical amplifier 26 and guarantees the unidirectional lasing operation of first frequency-comb generator 12. The output of first frequency-comb generator 12 is taken from an output coupler that is integrated into isolator 32. As a result, a predetermined percentage of the propagating light, e.g., 2%, is taken as the output of first frequency-comb generator 12 and a predetermined percentage of the propagating light, e.g., 98%, is taken as feedback for the first frequency-comb generator 12. The feedback portion of the propagating light is imputed into a tunable comb filter or etalon 34. Etalon 34 outputs optical energy having a spectrum defined by a comb of wavelengths or modes, each separated by a desired frequency. Each mode defines a corresponding optical frequency. In the depicted embodiment, temperature controller 36 is operatively connected to etalon 34. Utilizing temperature controller 36, the temperature of etalon 34 may be controlled in predetermined increments, e.g., tenths of a degree Kelvin, the frequency spacing of the modes may be fine-tuned. The output of etalon 34 is passed through variable optical attenuator 38 to control the output power of first frequency-comb generator 12 and through polarization cavity 36 to maintain the linear polarization of the frequency-comb traveling on fiber ring 25.

The outputs of first and second frequency-comb generators 12 and 14, respectively, are combined in any conventional manner at node 22. By way of example, the optical power of this combination may then be monitored with a data acquisition system, such as a photo receiver and a real-time sampling oscilloscope 24. The time trace recorded with this device can then be Fourier transformed, block 40. The combined outputs can also be recorded with optical spectrum analyzer 26.

It is noted first and second frequency-comb generators 12 and 14, respectively, may be combined on a single fiber ring having two polarization axes. As such, the effective lengths of polarization in the fiber ring are different. Therefore, the optical energy generated by a single optical amplifier will propagate on the fiber ring travel along paths of different length. In such manner, first and second frequency combs can be generated.

Figure 3:
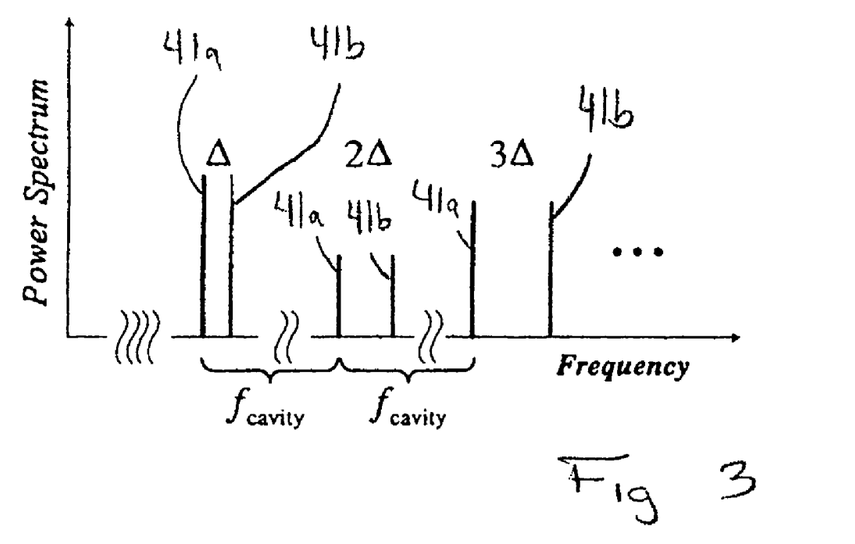
FIG. 3 is a graphical representation of the power versus the frequency of the frequency-combs generated by the frequency generators of the apparatus of the present invention.

In operation, the method of the present invention relies on first and second frequency-comb generators 12 and 14, respectively, to generate corresponding spectrums of light that are characterized as frequency combs with slightly different mode spacing. The frequency comb generated by the first frequency-comb generator 12 is designated by the reference number 41a and the frequency comb generated by the second frequency-comb generator 14 is designated by the reference number 41b, FIG. 3. As heretofore described, the mode spacing of the frequency combs may be controlled by using temperature controllers 36 to fine tune the temperatures of etalons 34 of first and second frequency-comb generators 12 and 14, respectively. Referring to FIG. 3, the mode spacings of the frequency comb generated by first frequency-comb generator 12 are designated as $f_{cavity}$ hertz, while the mode spacings of the frequency comb generated by second frequency-comb generator 14 are designated as $f_{cavity}+\Delta$ hertz. The difference between the mode spacings $\Delta$ of the frequency comb generated by the first frequency-comb generator 12 and the frequency comb generated by second frequency-comb generator 14 is kept small so the beat frequency of the modes is always significantly smaller than the mode spacing $f_{cavity}$ of the frequency comb generated by the first frequency-comb generator 12. The combined beam generated at node 22 will exhibit beats at m multiples of the difference between the mode spacings $\Delta$, i.e. $\Delta$, $2\Delta$, $3\Delta$, etc. When overlapping the frequency combs, the time trace of the optical power exhibits variations at various beat frequencies. If any of the frequency pairs would be attenuated, this would show up in the beat spectrum. By superimposing the two frequency combs, the methodology of the present invention allows a user to down convert and assign the optical frequencies of the two frequency combs to beat frequencies in a low frequency region.

Figure 4A:
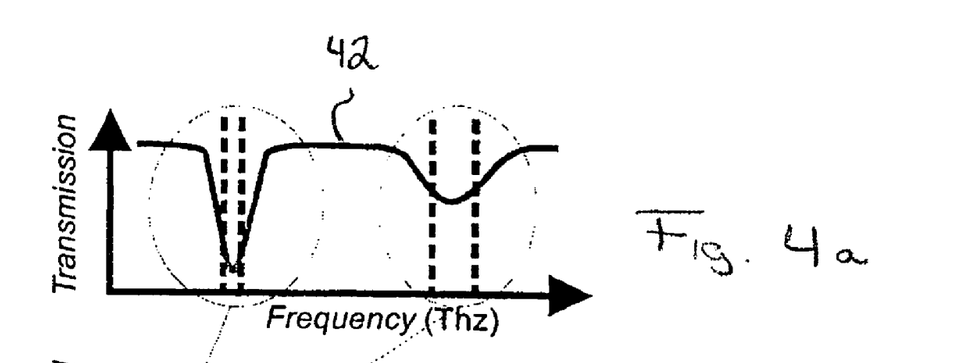
FIG. 4a is a graphical representation of an exemplary absorption spectroscopy showing the transmission intensity versus the frequency of the frequency-combs generated by the frequency generators of the apparatus of the present invention.
Figure 4B:
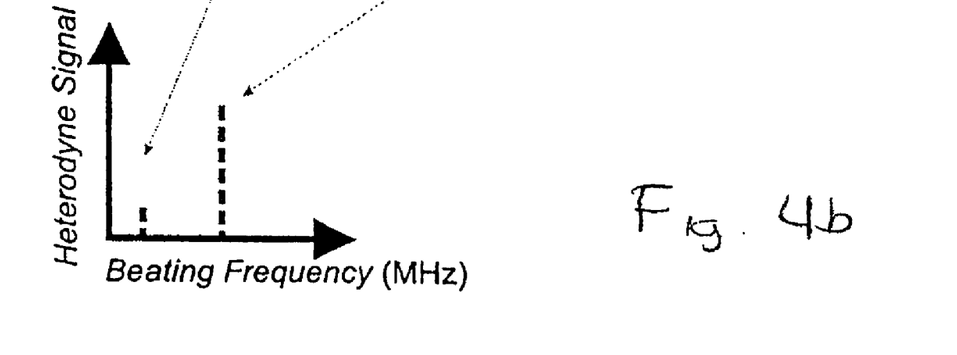
FIG. 4b is a heterodyned graphical representation of the signal depicted in FIG. 4a showing the heterodyned signal versus the beat frequency.

Referring to FIGS. 4a-4b, in the case of absorption spectroscopy, it is contemplated for first and second frequency-comb generators 12 and 14, respectively, to emit light of ordinary colors (high frequencies). However, each color is uniquely tagged by a low-frequency beat so that it can be identified downstream. The light is directed through an absorber such that certain colors are attenuated, depicted by curve 42 in FIG. 4a. The transmitted intensity is recorded as a function of time by the detector with a bandwidth high enough to encompass the low-frequency beat comb, FIG. 4b, but much lower than the optical frequency of light. The recorded time trace is Fourier transformed, and the retrieved transmission spectrum reproduces that of the absorber.

Figure 5:
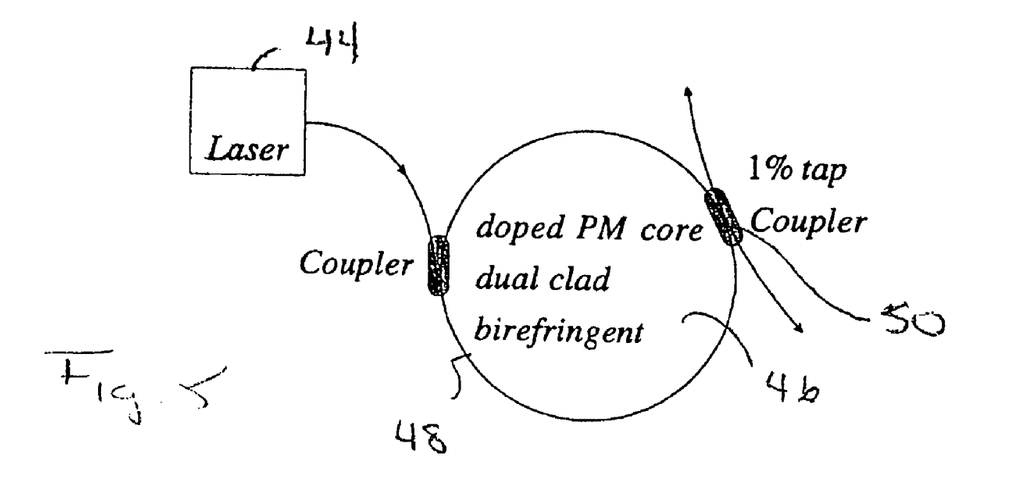
FIG. 5 is a schematic view of an alternate embodiment of the apparatus for conducting heterodyne frequency-comb spectroscopy in accordance with the present invention.

Referring to FIG. 5, it is contemplated to replace first and second frequency-comb generators 12 and 14, respectively, with external cavity laser 44 built with a birefringent medium in cavity 46. The frequency-comb emitted from an external cavity laser features equidistant modes and the mode spacing depends on the length of cavity 46. As is known, the round-trip travel time for light in a cavity, and hence, the cavity mode spacing, is proportional to the refractive index of the medium through which the light travels. As depicted in FIG. 5, optical radiation incident on a birefringent medium will generally travel as two orthogonally polarized waves that travel at different speeds. In this way, two different effective cavity lengths can be supported in a single laser cavity 46, each length supporting its own frequency comb. By choosing the appropriate birefringence, the detuning of the frequency combs can be adjusted.

It order to generate the optical beating in cavity 46, one of the polarized waves could be rotated by 90 degrees, or alternatively, the combined beam could be detected by a polarizer that has a polarization axis orientated at 45 degrees with respect to the two polarized waves. Polarization-maintaining fiber 48 sustains the two polarized waves with slightly different refractive indices. Due to the polarization-maintaining character of the core of fiber 48, the fiber will form cavities of two lengths. Output coupler 50 takes a predetermined percentage of the propagating light, e.g., 1%, as the output having a spectrum defined by a comb of wavelengths or modes similar to that depicted in FIG. 3.

Figure 6:
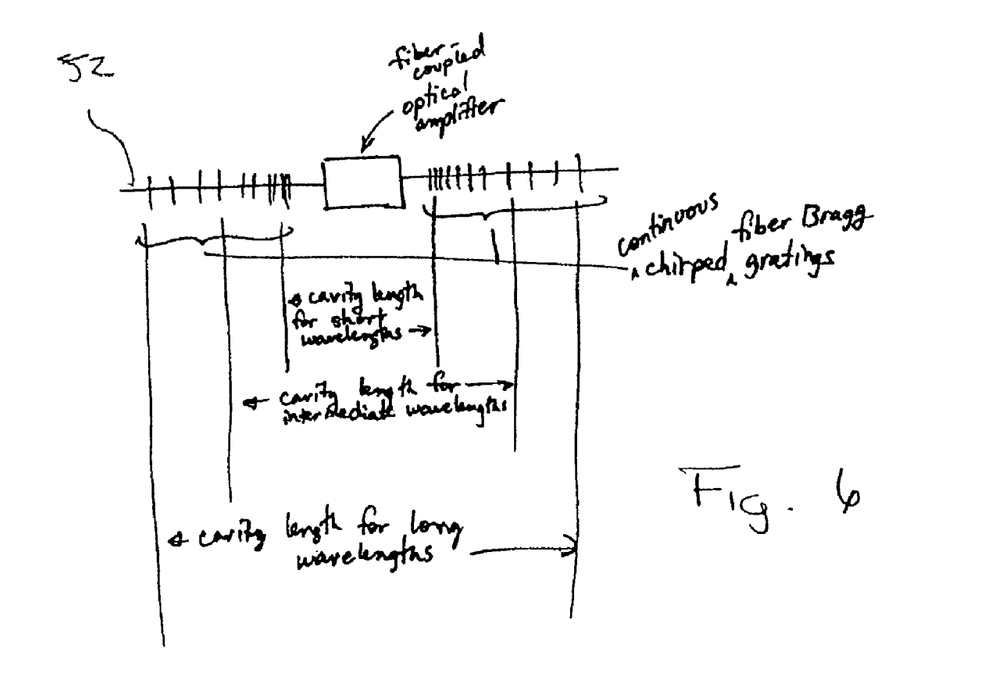
FIG. 6 is a schematic view of a still further embodiment of the apparatus for conducting heterodyne frequency-comb spectroscopy in accordance with the present invention.
Figure 7:
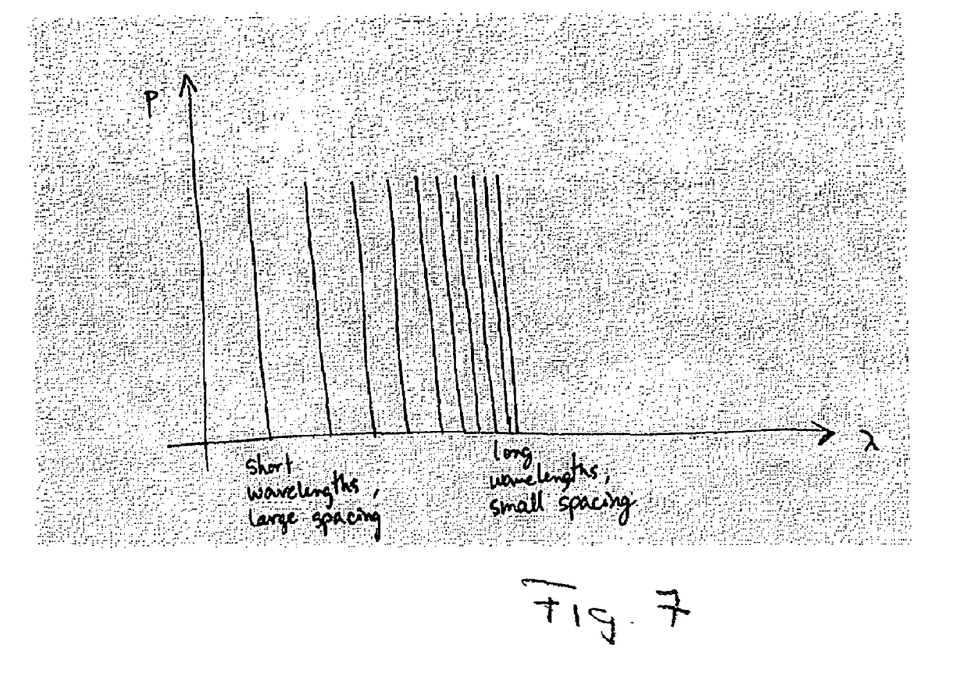
FIG. 7 is a graphical representation of the power versus the frequency of the frequency-combs generated by the apparatus of FIG. 6.

Referring to FIG. 6, in a still further embodiment, it is contemplated to provide a single chirped frequency comb that is arranged so that each optical frequency (color) beats at a unique radio-frequency. One way to do this is to build a laser cavity 52 with an effective length that has a chromatic dependence. Each reflector forming the cavity is a chirped fiber Bragg grating. In this realization, the shortest wavelengths oscillating in the cavity oscillate in a relatively short cavity, and the longest wavelengths oscillating in the cavity oscillate in a relatively long cavity. As best seen in FIG. 7, each feature in the depicted comb will beat with all the other features. If cavity 52 is designed appropriately, each beat frequency can be assigned to a unique optical frequency (color). In this way, a down conversion analogous to the one described above for the two-comb-generator case can be achieved with a single chirped comb.

Figure 8A:
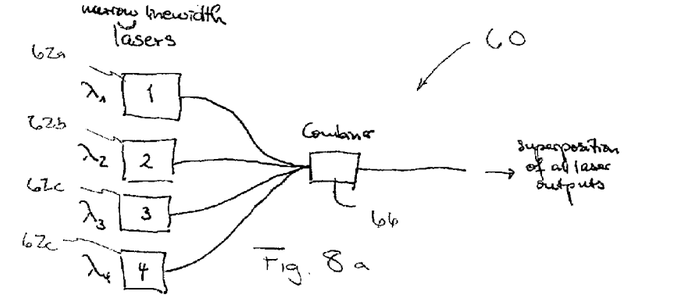
FIG. 8a is a schematic view of a still further embodiment of the apparatus for conducting heterodyne frequency-comb spectroscopy in accordance with the present invention.
Figure 8B:
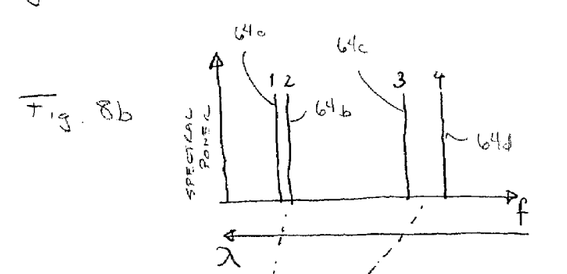
Figure 8C:
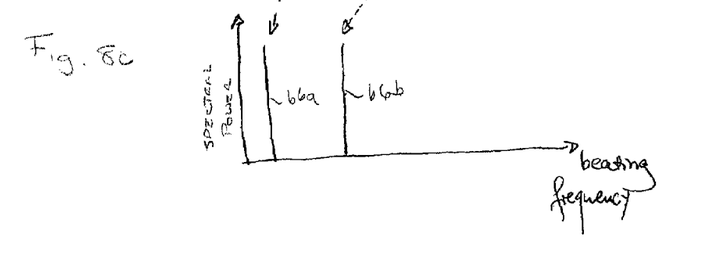
FIG. 8c is a heterodyned graphical representation of the signal depicted in FIG. 8b showing the heterodyned signal versus the beat frequency.

Referring to FIG. 8a, a still further embodiment of an apparatus for conducting heterodyne frequency-comb spectroscopy is generally designated by the reference numeral 60. Apparatus 60 includes a plurality of narrow bandwidth lasers 62a-62d. Narrow bandwidth lasers 62a-62d generate corresponding optical energies 64a-64d, respectively, at predetermined optical frequencies, FIG. 8b. Optical energies 64a-64d generated by narrow bandwidth lasers 62a-62d, respectively, are combined by combiner 66 such that the time trace of optical energies 64a-64d exhibits variations at various beat frequencies. As described, it can be appreciated that a user can down convert and assign the optical frequencies of optical energy pairs to beat frequencies 66a-66b in a low frequency region. FIG. 8c. In the case of absorption spectroscopy, optical energies 64a-64d are directed through an absorber such that certain colors are attenuated. The transmitted intensity is recorded as a function of time and the recorded time trace is Fourier transformed such that the retrieved transmission spectrum reproduces that of the actual spectrum of the absorber.

Figure 9A:
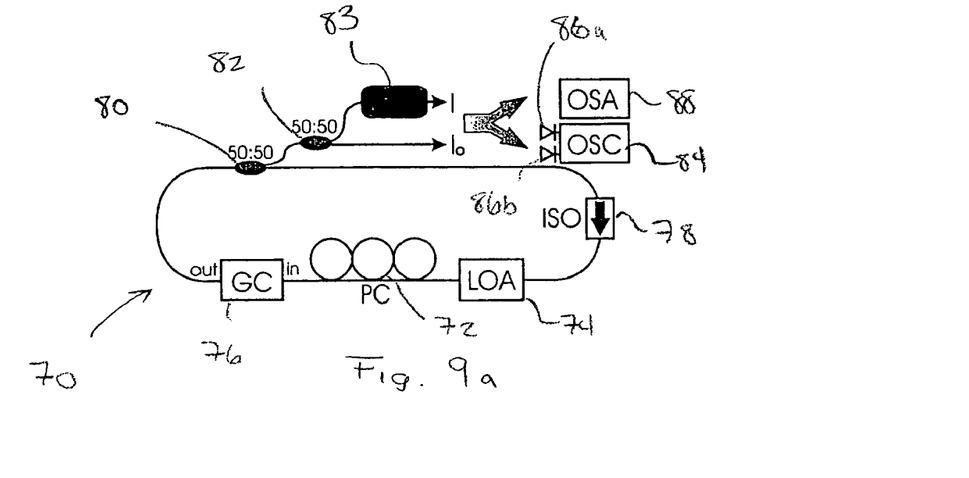
FIG. 9a is a schematic view of a still further embodiment of the apparatus for conducting heterodyne frequency-comb spectroscopy in accordance with the present invention.

Referring to FIG. 9a, a still further embodiment of an apparatus for conducting heterodyne frequency-comb spectroscopy is generally designated by the reference numeral 70. Apparatus 70 includes ring cavity 72 including linear optical amplifier 74, grating compressor 76, and isolator 78 that insures unidirectional lasing operation within ring cavity 72. Due to the grating dispersion, the length of ring cavity 74 is wavelength-dependent since the optical energies of different frequencies (or in other words, different colors) have different path lengths through grating compressor 76. As such, an unequally spaced frequency comb is generated. The output of ring cavity 72 is taken from output coupler 80 and the output of output coupler 80 is taken from output coupler 82 so to generate first and second frequency combs.

In operation, the first frequency comb is passed through sample of material 83 so as to generate absorption spectrum I. Absorption spectrum I and reference spectrum $I_o$ defined by the second frequency comb are provided to oscilloscope 84 through photo-receivers 86a and 86b and to optical spectrum analyzer 88, for reasons hereinafter described. Absorption spectrum I is defined by a plurality of not equally spaced modes m wherein the spacing of the modes changes as a function of the wavelength, FIG. 9b. The interference of adjacent modes exhibits unique beating frequencies $A_i$, and thus, produces a first order replica of absorption spectrum I in the radio-frequency range, FIG. 9c. In addition, a high order replica of the absorption spectrum I emerges from the interference of nearby, but not adjacent, modes, e.g., second order beating frequencies, $B_i$.

Figure 9B:
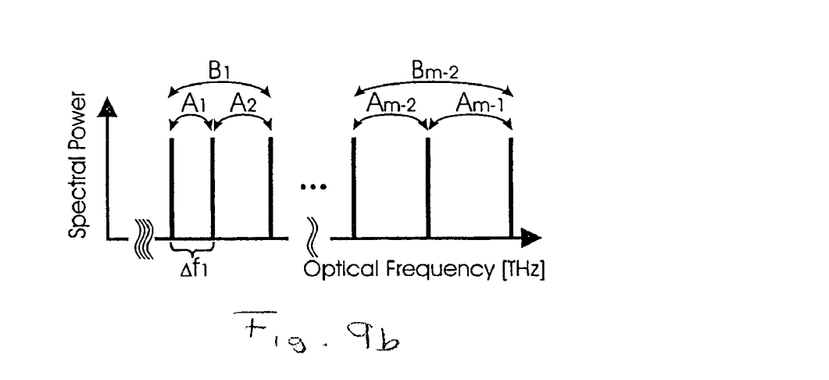
Figure 9C:
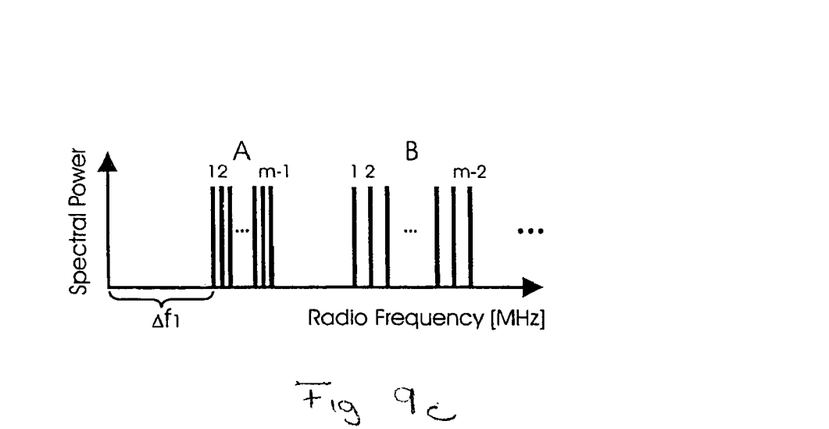

It can be appreciated that use of a higher order replica of the absorption spectrum I entails a coarser discretization. However, because of the diverging structure of the absorption spectrum I, the footprint in the radio-frequency Fourier space becomes larger in higher order replicas. Also, because the maximum full width half of each mode does not change when the mode is used in higher order, the effective finesse scales approximately with the order number. Additional advantages of high orders are the decrease of inherent semiconductor amplifier intensity noise associated with higher frequencies and the possibility of averaging multiple orders. The maximum order number is set when the information is two consecutive orders starts to overlap.

Various modes of carrying out the invention are contemplated as being within the scope of the following claims particularly pointing out and distinctly claiming the subject matter that is regarded as the invention.

We claim:

1. An apparatus for conducting heterodyne frequency-comb spectroscopy on a sample, comprising:

a first frequency-comb generator for generating a first continuous wave laser beam, the first beam defining a spectrum of light that includes a plurality of optical frequencies spaced by a first frequency;

a second frequency-comb generator for generating a second continuous wave laser beam, the second beam defining a spectrum of light that includes a plurality of optical frequencies spaced by a second frequency; and a beam combiner operatively connected to the first and second frequency-comb generators, the beam combiner combining the first and second beams upstream of the sample and providing the same as a combined beam having a plurality of beat frequencies dependent upon the optical frequencies of the spectrums of light defined by the first and second beams.

2. The apparatus of claim 1 wherein the first frequency-comb generator includes a filter having an input and an output, the filter controlling the spacing of the plurality of optical frequencies of the first beam.

3. The apparatus of claim 2 wherein the filter includes an etalon.

4. The apparatus of claim 3 wherein first frequency-comb generator includes a controller operatively connected to the filter, the controller controlling the temperature of the etalon, and wherein the spacing of the plurality of optical frequencies of the first beam is dependent on the temperature of the etalon.

5. The apparatus of claim 2 wherein the first frequency-comb generator includes an optical amplifier for generating an initial laser beam having predetermined optical power and an output coupler, the output coupler generating the first beam from a first output portion of the optical power and directing a feedback portion of the optical power to the input of the filter.

6. The apparatus of claim 5 wherein the first output portion of the optical power is equal to 2 percent of the optical power.

7. The apparatus of claim 5 wherein the first frequency-comb generator includes an isolator operatively connected to the optical amplifier and to the optical coupler, the isolator ensuring the optical power propagates in a first direction.

8. The apparatus of claim 5 wherein the first frequency-comb generator includes:
an optical attenuator having an input operatively connected to the output of the filter and an output; and
a polarization cavity having an input operatively connected to the output of the optical attenuator and an output operatively connected to the input of the optical actuator; wherein:
the optical attenuator controls the optical power of the initial laser beam; and
the polarization cavity maintains the linear polarization of the feedback portion of the optical power.

9. The apparatus of claim 1 further comprising a spectrum analyzer operatively connected to the beam combiner, the spectrum analyzer recording the combined beam.

10. The apparatus of claim 1 further comprising an enclosure for receiving the first and second frequency-comb generators therein.

11. An apparatus for conducting heterodyne frequency-comb spectroscopy on a sample, comprising:
first and second frequency-comb generators, each frequency-comb generator including:
a laser cavity for propagating optical power traveling therein;
an output coupler optically communicating with the laser cavity for receiving the optical power and generating a continuous wave laser beam from a first output portion of the optical power, the continuous wave laser beam defining a spectrum of light including a plurality of optical frequencies spaced by a frequency; and
a beam combiner operatively connected to the first and second frequency-comb generators, the beam combiner combining the first and second continuous wave laser beams generated by the first and second frequency-comb generators upstream of the sample and providing the same as a combined beam having a plurality of beat frequencies dependent upon the optical frequencies of the spectrums of light defined by the first and second continuous wave laser beams.

12. The apparatus of claim 11 wherein each frequency-comb generator includes a filter optically communicating with the laser cavity, the filter receiving a feedback portion of the optical power from the output coupler and spacing the optical frequencies of the spectrum of light by the frequency.

13. The apparatus of claim 12 wherein the filter includes an etalon.

14. The apparatus of claim 13 wherein each frequency-comb generator includes a controller operatively connected to the filter, the controller controlling the temperature of the etalon, and wherein the spacing of the plurality of optical frequencies of the spectrum of light is dependent on the temperature of the etalon.

15. The apparatus of claim 11 wherein the first output portion of the optical power is equal to 2 percent of the optical power.

16. The apparatus of claim 11 further comprising a spectrum analyzer operatively connected to the beam combiner, the optical spectrum analyzer recording the combined beam.

17. A method for conducting heterodyne frequency-comb spectroscopy, comprising the steps of:
generating at least one continuous wave comb defined by a plurality of optical frequencies;
designating the plurality of optical frequencies to generate modulations at lower beating frequencies; and
detecting the lower beating frequencies to observe an optical spectrum for the at least one continuous wave comb.

18. The method of claim 17 wherein the step of generating the at least one continuous wave comb includes the steps of:
generating a first continuous wave laser beam having a plurality of optical frequencies spaced by a first frequency that define a first continuous wave comb; and
generating a second continuous wave laser beam having a plurality of optical frequencies spaced by a second frequency that define a second continuous wave comb.

19. The method of claim 18 comprising the additional step of superimposing the first and second continuous wave combs to determine a beat spectrum.

20. The method of claim 18 wherein the step of generating the first continuous wave laser beam includes the steps of:
generating optical power having a spectrum;
filtering at least a portion of the optical power so that the spectrum has the plurality of optical frequencies spaced by the first frequency; and
generating the first continuous wave laser beam in response to the spectrum.

21. The method of claim 20 wherein the step of filtering at least a portion of the optical power includes the additional step of passing the portion of the optical power through an etalon.

22. The method of claim 21 wherein the etalon has a temperature and wherein the step of filtering at least a portion of the optical power includes the additional step of tuning the first frequency by adjusting the temperature of the etalon.

23. The method of claim 18 wherein the second frequency is greater than the first frequency.

24. A method for conducting heterodyne frequency-comb spectroscopy, comprising the steps of:
  generating a first continuous wave laser beam having a plurality of optical frequencies spaced by a first frequency that define a first continuous wave comb;
  generating a second continuous wave laser beam having a plurality of optical frequencies spaced by a second frequency that define a second continuous wave comb
  superimposing the first and second continuous wave combs to generate lower beating frequencies;
  exposing the superimposed the first and second continuous wave combs to a predetermined stimulus;
  detecting the lower beating frequencies to observe an optical spectrum.

25. The method of claim 24 wherein the step of exposing the at least one continuous wave comb to a predetermined stimulus includes the step of passing the at least one continuous wave comb through a sample.

* * * * *